(12) United States Patent

Spencer et al.

(10) Patent No.: US 9,298,827 B2
(45) Date of Patent: Mar. 29, 2016

(54) MEDIA RECORDER

(75) Inventors: Curtis Wayne Spencer, San Francisco, CA (US); Avichal Garg, Palo Alto, CA (US); Daniel Jonathan Witte, San Francisco, CA (US); Christine J. Tieu, Sunnyvale, CA (US); Chandra Prakash Patni, Brisbane, CA (US); Aditya Brij Koolwal, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 693 days.

(21) Appl. No.: 13/547,926

(22) Filed: Jul. 12, 2012

(65) Prior Publication Data

US 2013/0019149 A1 Jan. 17, 2013

Related U.S. Application Data

(60) Provisional application No. 61/506,974, filed on Jul. 12, 2011.

(51) Int. Cl.
| | |
|---|---|
| *G06F 17/30* | (2006.01) |
| *H04L 29/08* | (2006.01) |
| *H04N 21/239* | (2011.01) |
| *G11B 27/034* | (2006.01) |

(52) U.S. Cl.
CPC ........ *G06F 17/30864* (2013.01); *G11B 27/034* (2013.01); *H04L 67/1014* (2013.01); *H04N 21/2393* (2013.01); *G11B 2220/412* (2013.01)

(58) Field of Classification Search
CPC .................... G06F 17/30861; G06F 17/30887; G06F 17/30905; G06F 17/30864; G11B 27/034; G11B 2220/412; H04N 21/231; H04N 21/23103; H04N 21/239; H04N 21/2393; H04N 21/24; H04N 21/2405

USPC ......................................................... 725/115
See application file for complete search history.

(56) References Cited

U.S. PATENT DOCUMENTS

| | | | | | |
|---|---|---|---|---|---|
| 8,561,076 | B1 * | 10/2013 | Desai | ................. | H04L 67/322 709/225 |
| 8,667,056 | B1 * | 3/2014 | Proulx | ................. | H04L 67/325 370/229 |
| 2005/0108626 | A1 * | 5/2005 | Ong | ................. | G06F 17/30887 715/205 |
| 2007/0162947 | A1 * | 7/2007 | Bertin | ................. | H04N 21/2393 725/134 |
| 2008/0229374 | A1 * | 9/2008 | Mick et al. | ................. | 725/93 |
| 2009/0150947 | A1 * | 6/2009 | Soderstrom | ................. | 725/93 |
| 2009/0187477 | A1 * | 7/2009 | Bardin et al. | ................. | 705/14 |
| 2010/0125795 | A1 * | 5/2010 | Yu et al. | ................. | 715/723 |
| 2011/0154185 | A1 * | 6/2011 | Kern et al. | ................. | 715/234 |
| 2011/0289108 | A1 * | 11/2011 | Bhandari et al. | ................. | 707/769 |
| 2011/0320961 | A1 * | 12/2011 | Sriraghavan et al. | ................. | 715/753 |
| 2012/0017142 | A1 * | 1/2012 | Nagao | ................. | 715/211 |
| 2012/0310893 | A1 * | 12/2012 | Wolf | ................. | G06F 17/3089 707/661 |
| 2013/0283148 | A1 * | 10/2013 | Lim et al. | ................. | 715/234 |

* cited by examiner

*Primary Examiner* — Pankaj Kumar
*Assistant Examiner* — Alexander Boyd
(74) *Attorney, Agent, or Firm* — Fenwick & West LLP

(57) ABSTRACT

Systems and methods enabling the recording of a wide variety of online media for storage and later consumption are disclosed. The media can include audio, video, images, text and multi-media. The stored recordings can be played on internet-enabled devise such as televisions, mobile phones, personal computers, tablets, game systems, or the like. Recording is optionally accomplished using distributed recorders each making use of a virtualized browser.

23 Claims, 8 Drawing Sheets

MEDIA RECORDER

CROSS-REFERENCE TO RELATED APPLICATIONS

This application is claims benefit and priority to U.S. Provisional patent application Ser. No. 61/506,974 filed Jul. 12, 2011 and entitled "Media Recorder." The above provisional patent application is hereby incorporated herein by reference.

BACKGROUND

Field of the Invention

The invention is in the field of computer applications and more specifically in the field of recording information over a computer network.

SUMMARY

Various embodiments of the invention include systems and methods of recording media on a computer network. More specifically, some embodiments include systems and methods of recording media via the internet. The recorded media can include a wide variety of information including web page content, video, scripts, images, text, or the like. The recorded media is optionally stored for later retrieval and/or playback.

Systems of the invention optionally include an online recording system having computing devices configured to access remote media over the computer network. These computing devices are configured to perform functions such as those typically found in a client side browser. However, instead of displaying the media on a local display the computing devices store the media as it would be viewed on a browser. The stored media can then be viewed at a later time using a remote client of the recording system.

Various embodiments of the invention include a system comprising an API server configured to receive requests to record media retrieved from websites, the requests being received from remote clients of the API server; a plurality of optionally geographically distributed recorders each configured to record a type of media using a virtualized browser environment disposed on the respective recorder, members of the plurality of recorders being configured to record different types of media; and a recording queue manager configured to assign requests to record media to members of the plurality of recorders. The assignments can be based on information about the requestors, geography, and/or type of media requested. Members of the recorders are optionally configured to detect and prioritize multiple objects within a webpage for recording.

Various embodiments of the invention include a method of recording media, the method comprising receiving at a server a request to record media from a webpage, the request including an address of the webpage and optionally further information; placing the received request in a prioritized queue of recording requests; assigning the received request to a recorder based on type of media object, the recorder optionally being geographically remote from the server; using the recorder to load the webpage into a virtualized browser environment; parsing the loaded webpage to identify recordable objects within the webpage, parsing optionally including monitoring of the webpage within the virtualized browser environment; generating a first recording request for a first of the recordable objects, the first of the recordable objects including a text article disposed across multiple webpages; generating a second recording request for a second of the recordable objects, the second of the recordable objects including a video, the video optionally stored in multiple files; assigning the first recording request to a text recorder; assigning the second recording request to a video recorder; saving an output of the text recorder generated in response to the first recording request; and saving an output of the video recorder generated in response to the second recording request. Optionally transcoding the saved video recorder output to a form for display on an internet enabled device.

DETAILED DESCRIPTION

Figure 1:
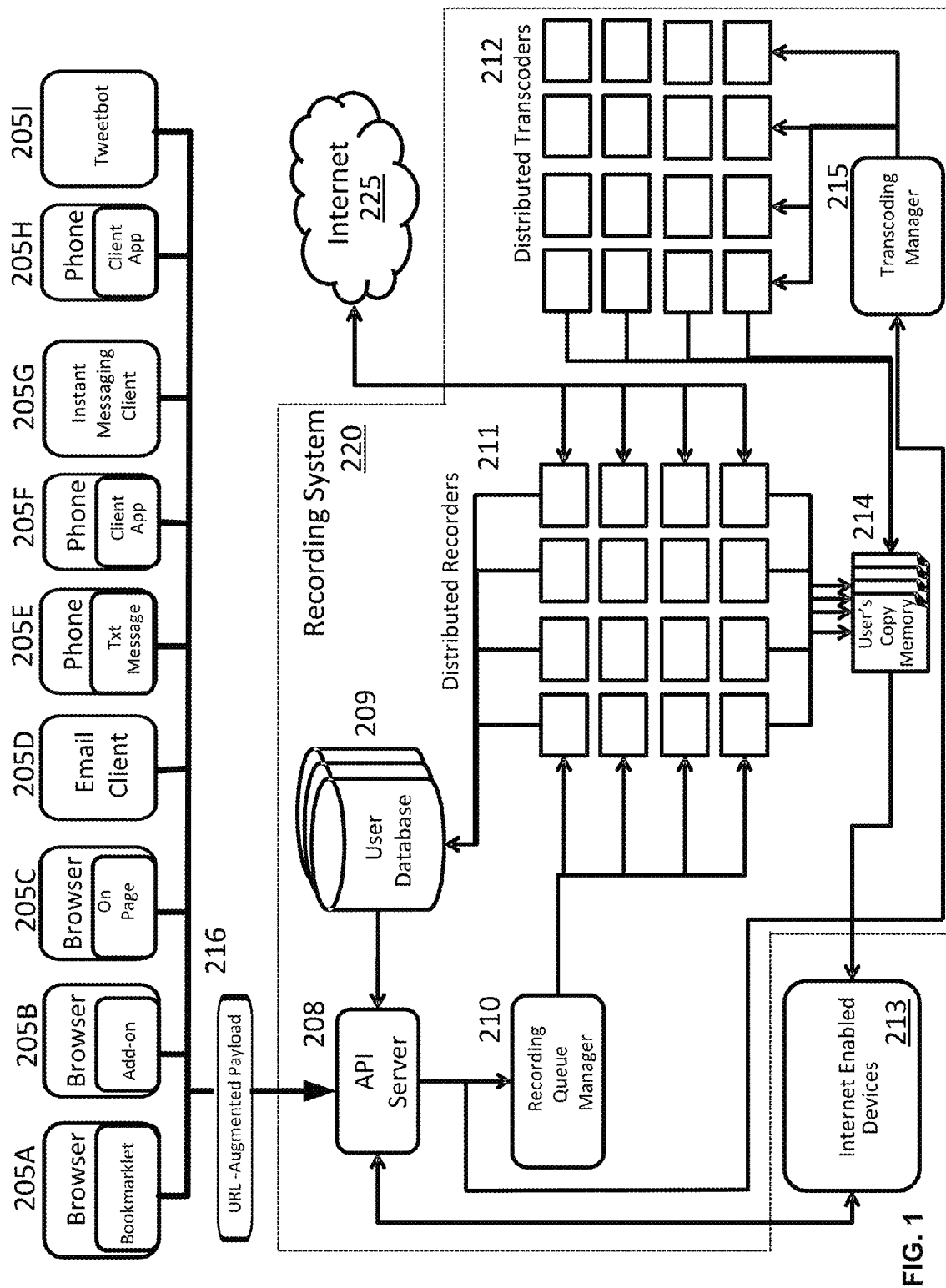
FIG. 1 is a block diagram illustrating a recording system and various elements in communication with the recording system, according to various embodiments of the invention.

FIG. 1 is a block diagram illustrating a Recording System 220 and various elements in communication with Recording System 220, according to various embodiments of the invention. Recording System 220 is typically a distributed system comprising an API Server 208, a Recording Queue Manager 210 and one or more User Databases 209. Recording System 220 may also include one or more Recorders 211, one or more Transcoders 212, a Transcoding Manager 215 and User's Copy Memory 214.

Recording System 220 is configured to communicate through the Internet 225 to and/or from web servers, file transfer protocol (FTP) servers, UDP servers, video servers, and/or the like. Recording System 220 is further configured to communicate to and/or from Internet Enabled Devices 213. For example, Recording System 220 is configured to send copies of saved media from User's Copy Memory 214 to Internet Enabled Devices 213. The Internet Enabled Devices 213 may include phones, tablets, televisions, set top boxes, personal computers, displays, and/or the like. The saved media is optionally communicated from Recording System 220 to Internet Enabled Devices 213 via the Internet 225.

Recording System 220 is also configured to receive requests to record media from a User Touchpoint 205. User Touchpoints 205 are individually indicated as 205A-205G in FIG. 1 and are optionally part of one of Internet Enabled Devices 213. User Touchpoints 205 are configured for sending recording requests to Recording System 220. As indicated in FIG. 1, User Touchpoints 205 can include a wide variety of devices and communication mechanisms. These include a browser with a bookmarklet (205A), an add-on (205B) or on page mechanism (205C), an e-mail client (205D), a phone configured to send text or MMS messages (205E), a phone with a client application (205F), an instant messaging client (205G), a personal file transfer application 205H, a twitterbot 205I, and/or the like. Touchpoints 205 include communication logic stored in a non-volatile manner on an electronic device having a microprocessor.

A bookmarklet, as included in Touchpoint 205A, is a piece of html and/or JavaScript code saved in a browser's bookmark bar. Clicking on a bookmarklet results in the html or JavaScript code being executed. The executed code interacts with the page the user is currently viewing and grabs information about the page such as but not limited to the page's address (URL), title, and the html of the page as rendered in the user's browser. Alternately, the JavaScript can rewrite the contents of the current page on the user's computer to load a richer JavaScript from a remote server into the DOM of the current web page. This JavaScript performs the same processing as the more sophisticated browser add-on.

An add-on or browser extension, as included in Touchpoint 205B, is a piece of software installed on the user's browser and permitted to have access to the same web page the user sees on her computer. The add-on performs more sophisticated interactions on the browser such as displaying confirmation messages to the user, processing the html the user sees before being displayed. When a browser add-on is used to initiate a recording request, the operations of the add-on are optionally applied to the web page before the request is sent to Recording System 220. One difference between the bookmarklet and the add-on/browser extension is the add-on is optionally configured to modify a web page dynamically on the computer executing the browser. For example, some embodiments of the invention include an add-on configured to automatically scan a web page for video content on the page without user input and display a record button or other user interface elements near this content on the page. This user interface element is configured such that when it is clicked by a user a request to record the video is sent to Recording System 220.

An on page mechanism, such as included in Touchpoint 205C, is logic such as a script or HTML included on a web page. This logic is configured to accept a click or other input from a user and in response send a recording request to Recording System 220. For example, a web page may include a video or a data stream and a button labeled "Record." When a user activates the button a recording request for the video or data stream is sent to Recording System 220. A web page can include several on page mechanisms each configured to initiate recording of a different part of the web page.

In some embodiments, the owner or publisher of a web page inserts the on page mechanism into the web page. They may have received the on page mechanism from a third party that maintains Recording System 220. For example, websites such as Facebook.com and Twitter.com can include an on page mechanism in a manner similar to that they use to provide "sharing" controls on a webpage. This is optionally accomplished by enabling a publisher of the web page to copy and paste HTML and/or JavaScript into their page once and send data through an API and authentication mechanism to the target service's (Facebook, Twitter, Spool, etc.) servers.

In some embodiments the on page mechanism is added to a web page after a browser has fully rendered the page. As with on page mechanisms inserted by a web page source, each on page mechanism may be associated with a different part of the page content. For example, in a Twitter stream, Facebook feed, or similar stream of information, an add-on can be configured to identify off-domain URLs and insert a small icon next to these URLs. Clicking on this icon would initiate a save request for the associated URL. In another example, an add on can be configured to modify existing "share" features on a web page such as those provided by "ShareThis" or "Add This" on Facebook.com and Twitter.com. This modification adds logic configured to send a record request to Recording system 220 to the feature. This approach provides a consistent user experience on the web page.

An e-mail client, such as included in Touchpoint 205D, is optionally configured to send a recording request to Recording system 220 by sending a request to a specific email address. For example, an e-mail may be sent to bob.xdrsuy@spoolbot.com. The body of the email can contain at a minimum the URL of the page the user wants recorded for later viewing. Other information included in the body of the email is optionally processed the same way that an html page on the Internet is processed.

A messaging service, such as included in Touchpoint 205E, is optionally configured to send a recording request to Recording System 220. For example, a text message including a URL can be sent to a specified number, short code or e-mail address. The source of the message is optionally used to identify the user requesting the recording and/or associate the request with a specific user account.

A client application, such as included in Touchpoint 205F, is optionally configured to send a recording request to Recording System 220. The client application may be included on a phone as illustrated or, alternatively, on a tablet, personal computer or the like. The client application, or a subset thereof, is optionally provided by a manager of Recording System 220. For example, a publisher of video editing software may include a routine provided by this manager in the video editing software. While executing the video editing software a user can then execute a "record" function that will result in recording of video from an internet connected source.

An instant messenger, such as included in Touchpoint 205G, is optionally configured to send a recording request to Recording System 220. For example, a chat session with Recording System 220 can be used to communicate recording requests. Examples of instant messengers include Yahoo Chat, Facebook Messages and Skype messaging.

A file transport protocol or personal file transfer system, such as included in Touchpoint 205H, is optionally configured to send a recording request to Recording System 220. For example, a user may upload a file to a remotely-accessible folder that is monitored by Recording System 220. When Recording System 220 identifies an appropriate file the file is parsed and one or more recording requests are extracted therefrom. This approach can be used to send multiple recording requests at once. Examples of personal file transfer systems include dropbox.com and box.net.

A twitterbot or other tweet sending service, such as included in Touchpoint 205I, can be used to send a recording request to Recording System 220. For example, one or more recoding requests can be included in a single tweet sent to @spoolbot. This address is monitored by Recording System 220, which parses the tweet to extract the one or more requests. The identity of the originator of the tweet is optionally used to associate the requests with a user account for Recording System 220.

Typically, a recording service is initiated after Recording System 220 has received a request from one of Touchpoints 205. However, in alternative embodiments, the recording service may also be initiated via other mechanisms, including but not limited to an automated subscription service or a caching method that operates independently on behalf of the user. A request for recording is passed through an API Server 208 configured to processes recording requests. The request has a payload to start the recording process. At a minimum this includes the target address of the page the user wishes to record. This address includes a URL (universal resource locator), IP address, and/or the like. In some cases, Recording System 220 has access to additional information included in the recording request. Requests that included additional information are referred to herein as Augmented Payloads 216. In typical embodiments, the user identifies and/or authenticates herself in order to make requests to the API Server 208 and as a result the API Server 208 will know the identity of the requestor. This identity can be that of the user or of the user's device. The identity is used to retrieve information about the user and/or the user's device from a User Database 209. This information may include the geographic location of the user's device, a user's account status/type, current and previous recording requests, the status of any previous recording requests, any limitations that may be placed on the account, and/or the like. The information may also include a user's geography and if they have a premium account, their current and previous recording requests, any limitations that may be imposed on the account, and/or the like. The information in the User Database 209 and how it is used is discussed further elsewhere herein.

API Server 208 includes a computing device such as a webserver having a microprocessor, storage and communication hardware. API server is typically configured to perform the functions described herein using logic that includes specialized hardware, firmware and/or software stored on a non-volatile computer medium. User Database 209 includes user data stored on a non-volatile medium in a format that can be queried or otherwise looked up.

Once a recording request is processed at the API Server 208 it may be communicated to a Recording Queue Manager 210. A request may not be communicated to Recording Queue Manager 210 if, for example, the user already has too many requests pending, it is to a website known to include malware, or it requires that a user upgrade their account status, etc. Recording Queue Manager 210 is configured to place received recording requests in an incoming request queue. This queue is prioritized based on a variety of factors some of which are discussed elsewhere herein. A Recorder Allocation Service 501 (FIG. 4) is configured to pull recording events from the top of the priority queue and initiates the recording process. From the recording request's data payload (URL and possibly additional data) the Recorder Allocation Service 501 determines how to retrieve the media requested by the user. As discussed elsewhere herein, this media may include all or parts of a web page. The Recorder Allocation Service 501 is configured to allocate different technologies to download the requested media depending on the type(s) of media requested.

Figure 2:
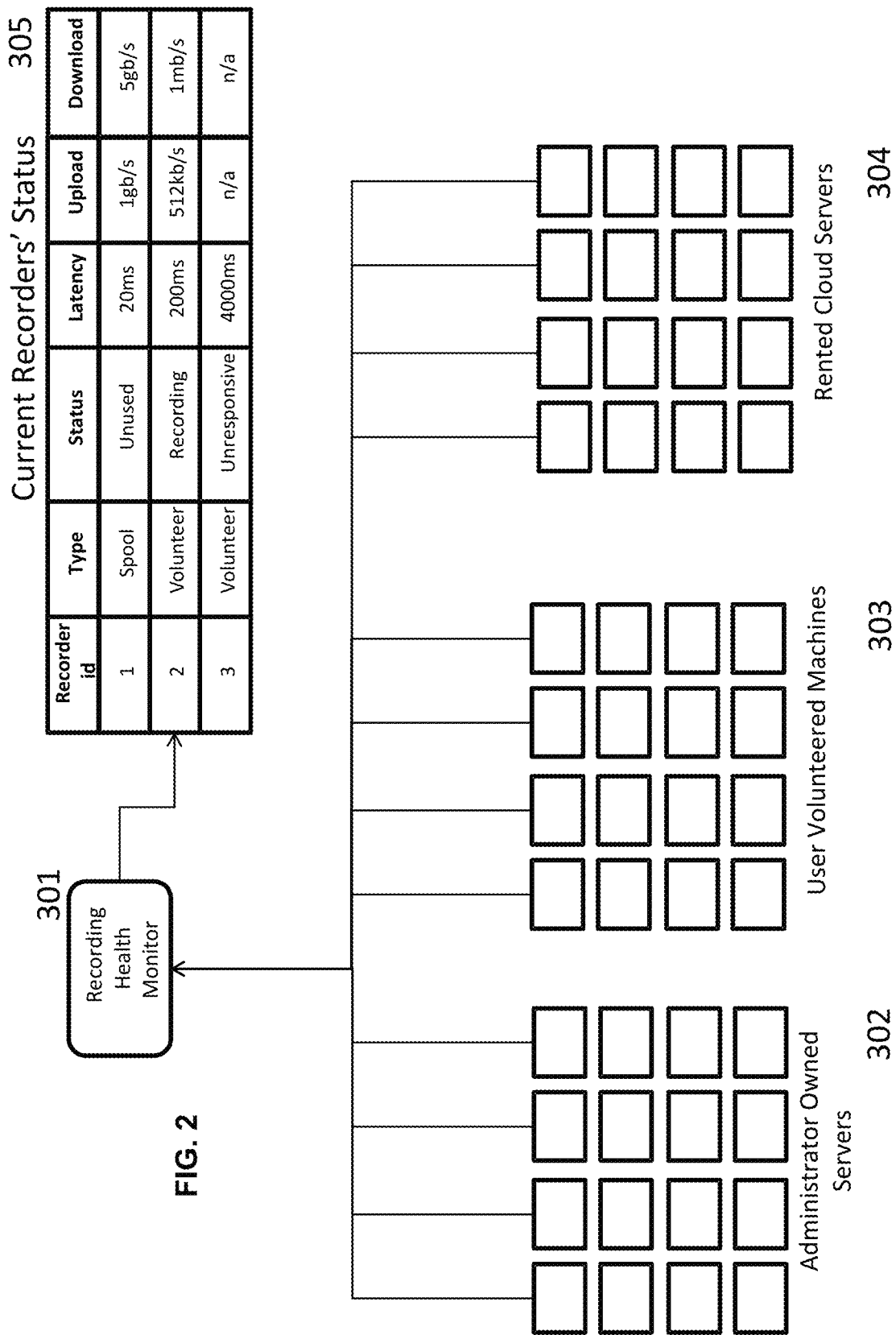
FIG. 2 is a block diagram illustrating the storage of status data relating to various recording devices, according to various embodiments of the invention.

A Recording Health Monitor 301 (FIG. 2) is configured to run in parallel to the Recording Queue Manager 210 and to maintain a set of Recorders 211. The set of Recorders 211 is optionally geographically distributed. As illustrated in FIG. 2 Recorders 211 can include Administrator Owned Servers 302, user Volunteered Machines 303 and/or Rented Cloud Servers 304. Administrator Owned Servers 302 are servers that are controlled by the administrator of Recording System 220 and are optionally dedicated to recording operations. User Volunteered Machines 303 are computing devices that are controlled/owned by users of the recording service. For example, a user may offer part time use of their personal computing device as a recorder in exchange for a premium or discounted level of service. Rented Cloud Servers 304 are computing devices that can be rented from third parties such as Amazon's cloud computing services. Rented Cloud Servers 304 are typically rented on an on-demand basis as needed.

Recording Health Monitor 301 is configured to monitor the health (status) of Recorders 211. As illustrated in FIG. 2 these status are optionally stored in a Data Structure 305. In contrast, Recording Queue Manager 210 is configured to manage queues of pending recording requests. Recorder Queue Manager 210, Recorder Allocation Service 501 and Recorder Health Monitor 301 each part of Recording System 220 and each include logic configured to perform the operations described herein. This logic includes hardware, firmware and/or software stored on a non-transient computer readable medium. Recorder Queue Manager 210, Recorder Allocation Service 501 and/or Recorder Health Monitor 301 are optionally included on the same computing device.

There are several alternative mechanisms in which a recording can be initiated. For example, in some embodiments, when a user encounters a page that has content the user wishes to record, they initiate a save request through one of Touchpoints 205. If the method of making the request involves communicating only a URL to API Server 208, then the recording service will be started with only that information. If the method making the request has access to additional data, such as the contents of the page as seen by the user, then this information may be preprocessed prior to recording. Depending on the type of information, this preprocessing can occur on the user's computer or on Recording System 220.

When more information about the media to be recorded, other than merely a URL or IP address, this information is optionally obtained by preprocessing of a web page on the client having the touch point from which the request is sent. Preprocessing can include text extraction, image/audio/video content candidate identification, and/or the like. Preprocessing on the client has an advantage in that snapshots of a web page exactly as a user would see it can be obtained. This is useful for dynamically changing pages or personalized pages that render uniquely for each user. For example, if a web page will change depending in the contents of a cookie on a client device, these changes can be recorded if the cookie information is included in the Augmented Payload 216. Similar results can be achieve for web pages that are dependent on factors such as a user account, client device type, client display capabilities, time of day, and/or the like.

Preprocessing is optionally performed by an agent on Touchpoints 205. This agent may include JavaScript or other computing instructions. Following preprocessing, this agent is configured to make a remote server request to Recording System 220 for the recording. This request includes the Augmented Payload 216 resulting from any preprocessing. In various embodiments Augmented Payload 216 includes: the URL of the requested media (e.g., web page or component thereof), full HTML contents of the page, contents of extracted entities (<object>, <img>, <video>, JavaScript), a login cookie, and/or any credentials required to access the target page (such as username or password credentials). The login cookie can be used to identify the requesting user, client or user account so that Recording System 220 can associate the request with the correct entity. For example, in some embodiments, contents of a login cookie are used by API Server 208 to query User Database 209 and retrieve user and/or client information. The credentials are used by Recording System 220 to access requested media that requires authentication.

Figure 4:
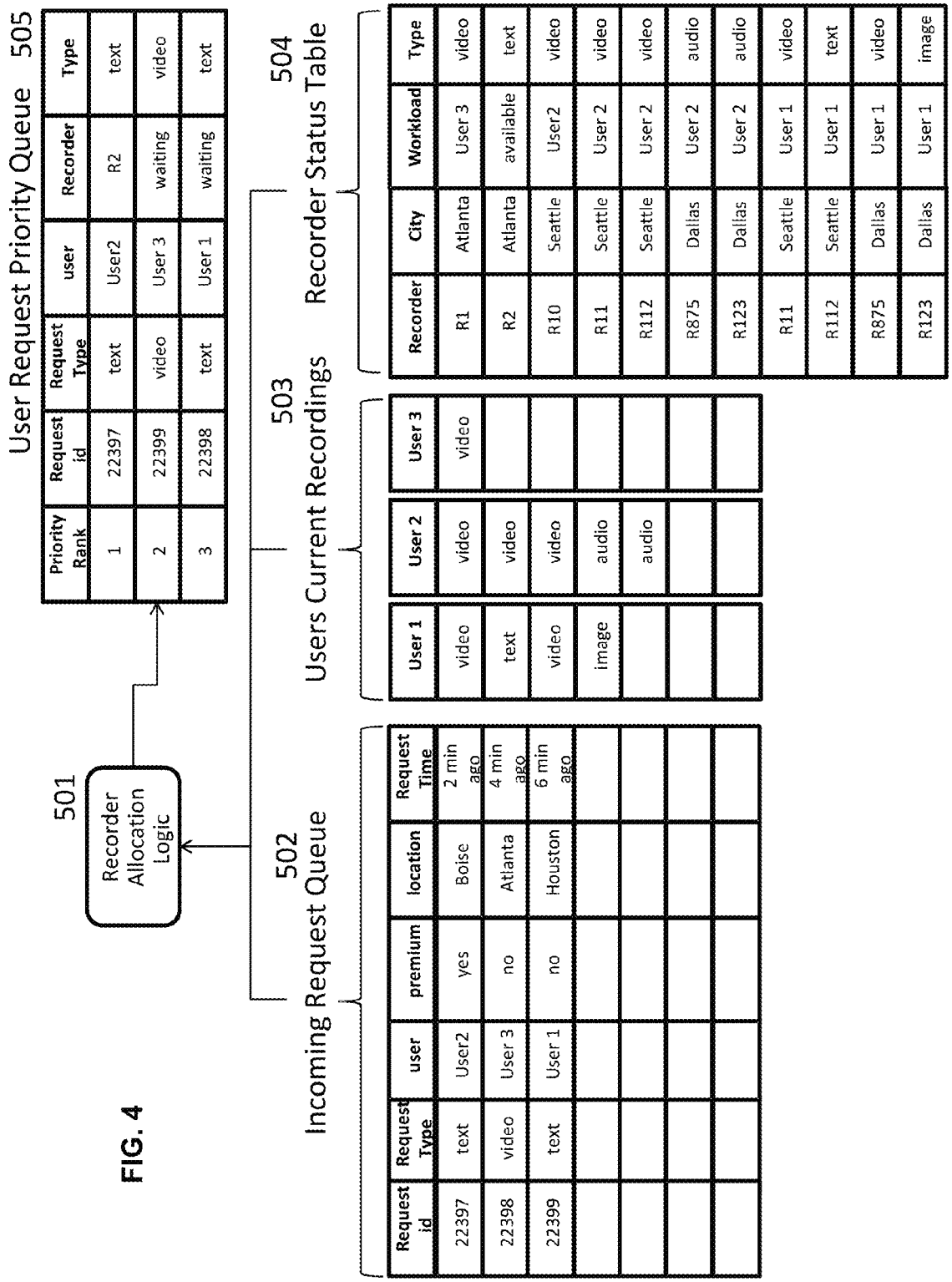
FIG. 4 is a block diagram illustrating further details of part of a recording queue manager, according to various embodiments of the invention.

As illustrated in FIG. 4 incoming requests are stored in an Incoming Request Queue 502 by API Server 208. Incoming Request Queue 502 is optionally included in User Database 209 and includes a list of user requests to be processed. Recorder Allocation Logic 501 is configured to prioritize requests for recording using Recorders 211. This prioritization is subject to information maintained by Recording Health Monitor 301, which manages the Recorders 211 that are task with fulfilling specific recording requests. The Recording Allocation Logic 501 and Recording Health Monitor 301 together comprise Recording Queue Manager 210, and include hardware, firmware and/or software stored on a computer readable medium.

Recording Request Queue 502 includes a number of pieces of information per request. For example, in some embodiments the data structure of Recording Request Queue 502 includes a unique id for the request, the type of request this is (text, image, video, audio), the user/client that made this request, the location from which the request was made, the time the request was initiated, the URL of the page that the user would like the record, any candidate text elements or video elements that should be considered for extraction, the number of credits (necessary to consume media) that the user has remaining, and whether the user is a premium that deserves special treatment. This data structure is used at various stages of the recording progress so not every piece of data will be used in every step. For example, in some embodiments, Recorder Allocation Logic 501 does not need to know that there are multiple video candidates in a recording request but may take advantage of other pieces of information. Or Video Recorder 710 may take advantage of the fact that the recording request has multiple candidate videos that the Video Recorder 710 needs to extract but it may not care at that point whether or not the user is a premium user.

Recorder Allocation Service 501 is optionally configured to consider a variety of factors when prioritizing the requests received at Incoming Request Queue502. These requests can come from a large number of users. Recorder Allocation Service (501) can be configured to prevent one user from monopolizing the limited resources of Recording System 220, to prevent malicious users from trying to maliciously tax (spam) the system, to allow users who have premium accounts to get priority in the queue, and/or to enable a maximum amount of work to be accomplished with a fixed amount of computational resources. The factors that the Recorder Allocation Logic 501 takes into account when prioritizing recording requests include some of the following but may also include other factors A number of requests in Incoming Request Queue 502 for that user as stored in a User's Current Recordings Data Structure 503—this is to prevent a single user from monopolizing resources at the detriment of other users.

Types of requests in Incoming Request Queue 502—a user who has a single long running video recording will be consuming the same total resources per hour as a user who queues up twenty, 3-minute videos. Recorder Allocation Logic 501 can take into account the types of requests the user currently has in the system to enable shorter, easier to process requests to flow through ahead of longer requests.

Geography of user's requests and available resources—typically Recording System 220 includes geographically diverse resources and some requests from a particular location can be more easily served than others. Recording Allocation Logic 501 optionally tries to use recorders located near a requesting user so as to most closely approximate the experience the user would have had by visiting a particular site from their home computer. However, if needed Recorders 220 in other geographies can be used. For example, a request from London, England at 4:00 AM local time may be more easily serviced in England because the servers located near that user are not in demand. Whereas in San Francisco, Calif. at the same time it will be 8:00 PM local time and there will be more active users making recording requests from San Francisco. This places a higher load on the servers near San Francisco and may require Recorders 220 in other geographies to process user requests. Recorder Allocation Logic 501 considers the originating geography of the request and the geography of available resources in deciding how to allocate resources.

Premium Membership—in some embodiments Recording System 220 has users who have accounts that grant them premium access to Recorders 211. Requests from these users will be processed before non-premium users' requests, but may be subject to the same set of constraints around spam, geography, and type of requests.

Time since the request was initiated—We start recording all requests within a short period of time, By tracking and incorporating how long a request has been in the queue we can make sure that non-premium users with long running requests still have their requests processed in a timely manner. This is subject to available resources.

Recorder Allocation Logic 501 may also be configured to consider a Recorder Status Table 504. Recording Status Table 504 is stored in memory accessible to Recorder Allocation Logic 501 and includes the type, geography, current workload and other aspects of available recorders. In some embodiments this information is considered in pairing a recording request with a recorder and prioritizing the recording request.

In the case where there is more recording capacity than user requests, Recorder Allocation Logic 501 is configured to simply let all requests through by sending a user's request to a recorder geographically closest them. The measure of closeness may include communication network bandwidth as well as physical closeness.

In cases where there are more user requests than current recording capacity, a possible prioritization scheme is to limit each user to a maximum number of concurrent recorders, then process all premium subscription holders before any non-premium subscribers, and process in-coming requests in a first-come-first-serve basis. Preference is given to recorders closest to the user's point of origin.

Application of this prioritization scheme can be illustrated in reference to the data illustrated in FIG. 4. With limited resources, Recorder Allocation Logic 501 is configured to first allow User 2 to get access to a recorder nearest their local geography (Seattle). User 2's request is processed before User 1 or User 3 because User 2 is a premium subscriber, even though User 3 and User 1 have been waiting longer for their request to be processed. If no recorder is available for User 2 near her geography, the queue manager allocates a recorder from a farther geographic location (Atlanta) for User 2. Next, Recorder Allocation Logic 501 considers User 1 since she has been waiting for the longest for her request. But User 1 already has four requests being processed somewhere on the network and the (example) hard limit has been set for users is no more than two current recorders. So, Recorder Allocation Logic 501 will skip over User 1 and process the request for User 3 because User 3 is not currently consuming the maximum allowed recording resources, even though User 3's request came into the queue chronologically after User 1's request.

In addition to passing workloads to recorders, Recording System 220 is typically configured to manage the health of Recorders 211 and to determine if additional computing resources should or can be allocated be Recorders 211. Recording Health Monitor 301 handles monitoring the current load on the queues, wait times for users, and other factors to determine when to scale by adding more servers. Dynamic scaling of resources enables Recording System 220 to handle spikes in usage and remain cost effective because machines that are not being used can be shut down. Different types of resources can be prioritized for use. For example, Administrator Owned Servers 302, which represent a fixed cost, may be allocated first. Then User Volunteered Machines 303 are allocated next. Finally, Rented Cloud Servers 304, which represent a dynamic cost, are allocated last.

Administrator Owned Servers 302 are servers that are owned by an administrator of Recording System 220. These dedicated machines are typically running 24 hours a day, 7 days a week. User Volunteered Machines 303 are computing devices that users have volunteered to the administrator of Recording System 220 to use as a secure tunnel to the Internet, for recording tasks, and/or for transcoding tasks. Use of these machines may not have direct costs. However, users may be compensated by being given premium access via premium membership, or some other indirect compensation scheme. Rented Cloud Servers 304 are servers that are rented by an Administrator of Recording system 220. These servers may be rented by the minute, hour, day, week, or month. These servers can be dynamically allocated and de-allocated as needed.

Figure 3:
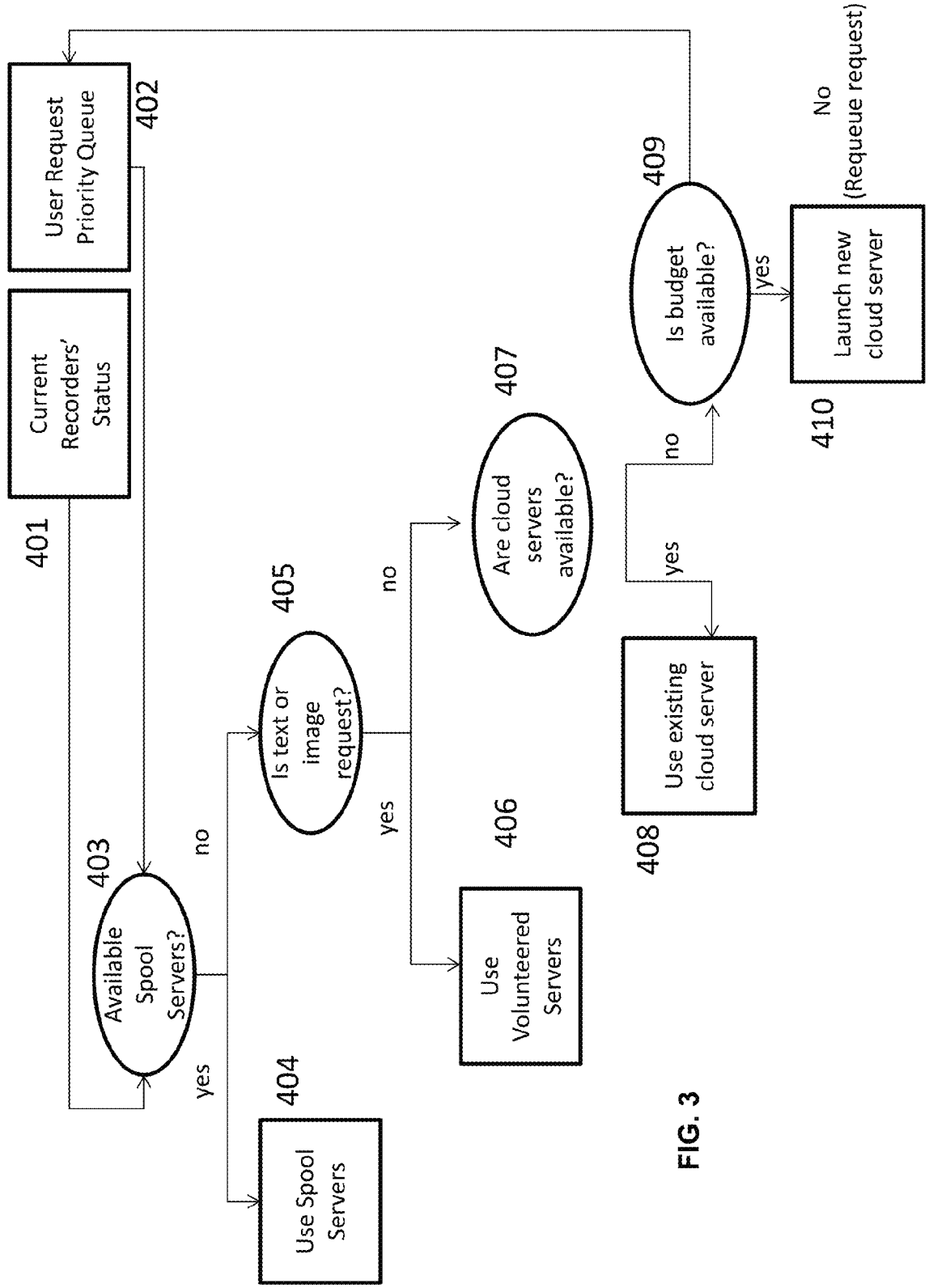
FIG. 3 is a flow chart illustrating methods of allocating user requests to recording servers, according to various embodiments of the invention.

The different types of resources each have different costs, reliability, power, and flexibility associated with them. As a result, in some embodiments, new Recorders 211 are allocated using information about their existing status and the priority queue of users' requests. An example of how Recording Queue Manager 210 can allocate resources, according to some embodiments, is illustrated in FIG. 3.

In a step 401 current recorder's status is received by Recording Queue Manager 210. In a step 402 a recording request is communicated to Recording Queue Manager 210.

In a step 403 Recording Queue Manager 210 checks if sufficient Administrator Owned Servers 302 are available for the allocation and execution of the recording request. If one of Administrator Owned Servers 302 is available, then the recording request is assigned to the available server in a step 404.

If an Administrator Owned Server 302 is not available, then in a step 405 the type of request is considered. If the recording request is to fetch/save text or images, then the recording request is assigned to one of User Volunteered Machines 303 in a step 406. Generally, recording tasks that involve simpler media such as text are assigned to slower or less reliable servers. This is relative to recording tasks that involve more computationally intensive or longer recording tasks (e.g., video or audio) that are assigned to more reliable servers.

If the recording request is for a multimedia type other than an image or a text request, then in a step 407 it is determined if one of Rented Cloud Servers 304 is available for allocation of the recording request. If a Rented Cloud Server 304 is available then the recording request is assigned to that Rented Cloud Serer 304 in a step 408.

If a Rented Cloud Server 304 is not available then the renting of an additional Rented Cloud Server 304 is considered in a step 409. This consideration can be based on available budget, limits on a maximum number of concurrent servers, cost of renting, locations of possible servers and the requestor, a number of pending recording requests, how long recording have been pending, and/or the like. If it is determined to rent a new Rented Cloud Server 304 then this server is rented and allocated to the recording request in a step 410. If it is determined not to rent a new Rented Cloud Server 304 then the request is returned to User Request Priority Queue 505. The recording request will then be reconsidered using the process illustrated in FIG. 3 at a later time.

Receipt of a recording request from one of Touchpoints 205 may result in queuing of multiple recording requests within Recording System 220. This is because a request to record a web page may include recording of multiple objects and/or media types. If the recording request includes merely a URL then the content found at the URL is first processed by Recording Queue Manager 210 to determine details of the content, e.g., a number of objects and media types found in the content. Each object is a potential item to be recorded. If the recording request includes an Augmented Payload 216, e.g., a preprocessing was performed at the Touchpoint 205, then the recording request is optionally divided into a set of recording requests, one for each object of interest or media type, which are added to Incoming Request Queue 502 in parallel.

Figure 7:
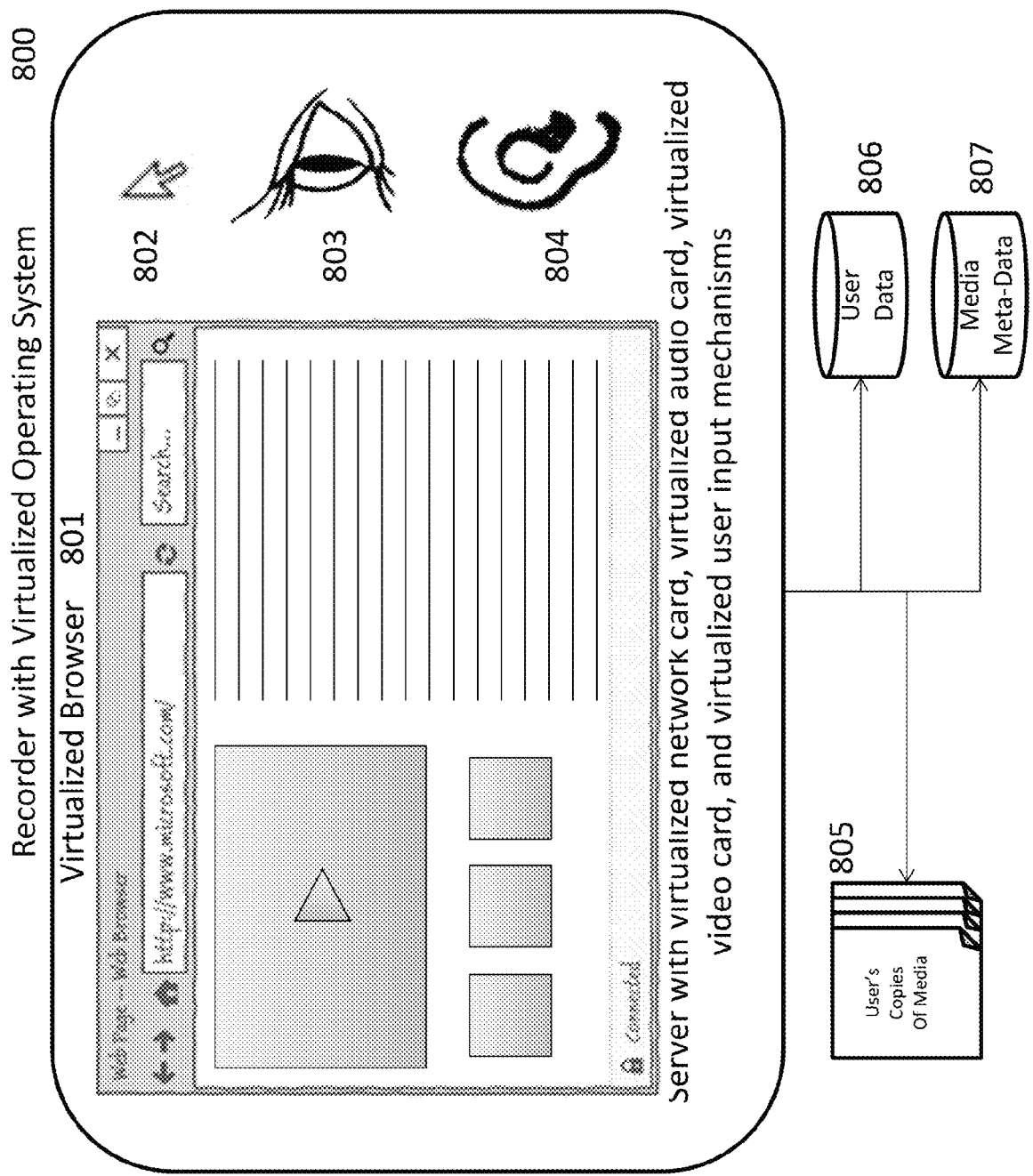
FIG. 7 is an illustration of a virtualized browser environment, according to various embodiments of the invention.

In some embodiments, Recording System 220 is configured such that a determination of which objects should be recorded on a page is made in a manner similar to what a human would do if tasked with saving relevant portions of a web page. As illustrated in FIG. 7, this may include moving a cursor 802, clicking on a screen, listening for audio to play 804 when a virtual browser (801) is on a page, and watching the screen for changes in pixels 803. In Recording System 220 these tasks are accomplished without human intervention. Typically, these actions are taken autonomously on a Computer 800. Computer 800 may be part of Recording system 220 or a client on which one of Touchpoints 205 is hosted.

Figure 5:
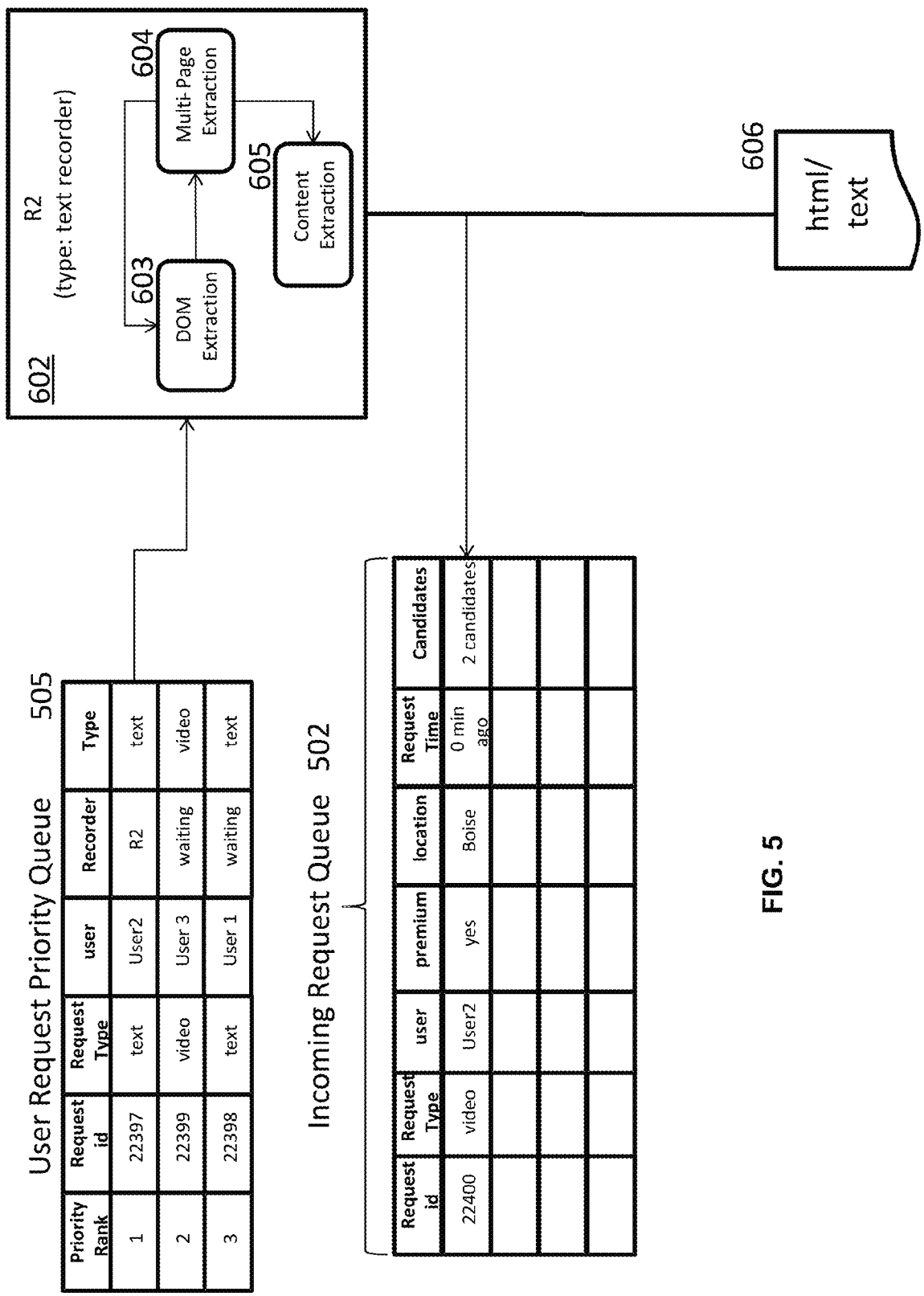
FIG. 5 is a block diagram illustrating functionality of a text recorder, according to various embodiments of the invention.
Figure 6:
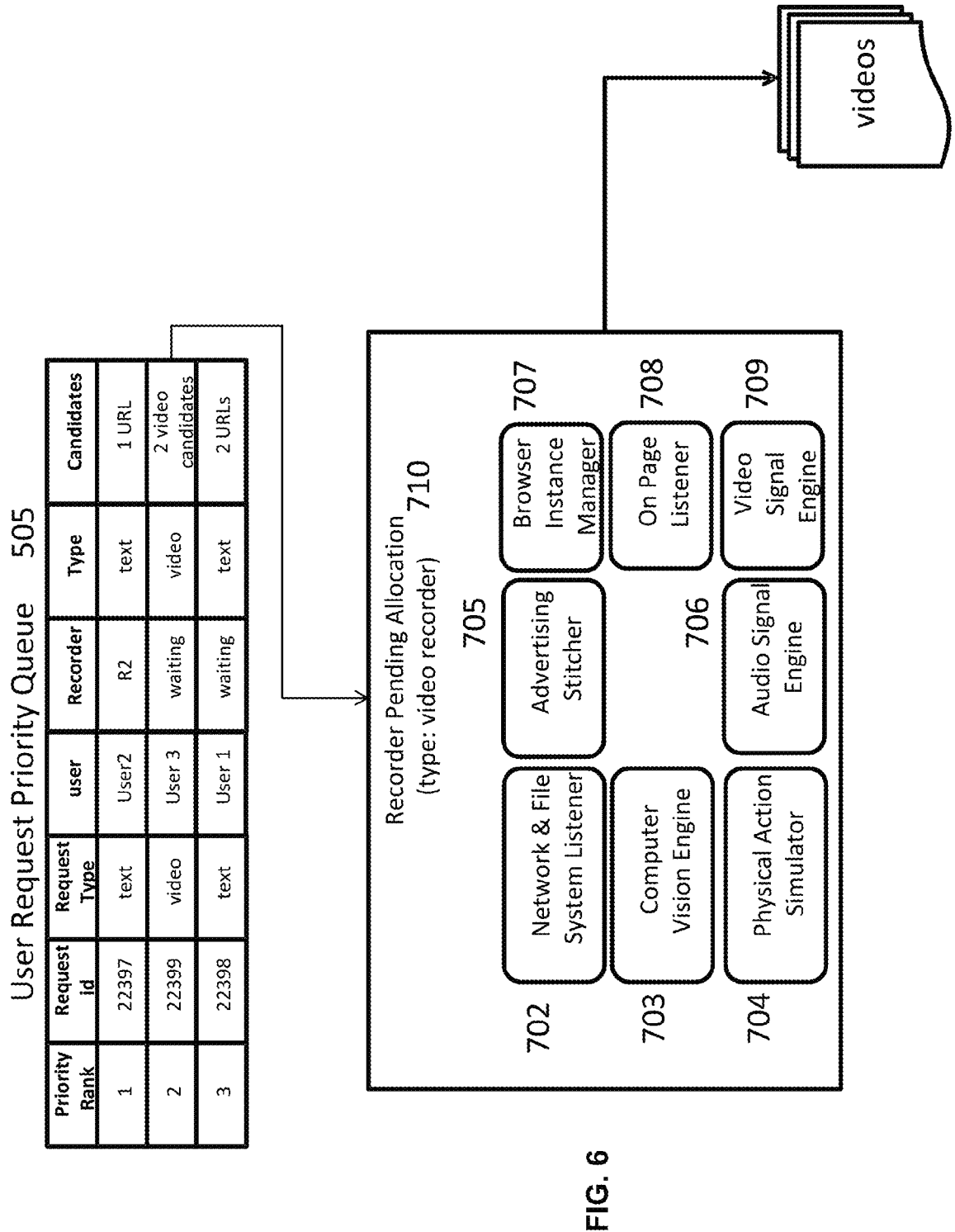
FIG. 6 is a block diagram illustrating a video recorder, according to various embodiments of the invention.

FIG. 5 illustrates details of a member of Recorders 211 that is configured as a Text Recorder 602. In typical embodiments there are two goals to text extraction for which Text Recorder 602 is configured. A first goal is extracting text a user would like to read from the page, exclusive of any html. This includes extracting text from a page where the user would have to perform additional navigation to read the full body of text they desire. For example, multi-page (text) articles or landing pages that require the user to click through to see the entire text of an article, page, or blog post. A second goal is extracting references to content such as image, audio, and video. As discussed elsewhere herein, such analysis can occur client side as well as on Recording System 220. Once extracted, these references can be replaced with references to copies of the objects (e.g., images, audio or video) stored in User Copy Memory 215.

In some embodiments text extraction includes a three-step process. In an initial DOM Extraction Step 603 a first pass extraction of the most important HTML and DOM elements on the content at the candidate URL is performed. In a Determine Multi-page Step 604 it is determined if the content at the candidate URL is the first page of a multipage article.

a. If the content is a complete article, the process moves to a Content Extraction Step 605.

b. If the content is a multipage article but the candidate URL does not point to the first page of the article, an attempt to identify an address of the first page and the process will return to DOM Extraction Step 603.

c. If the content is the first page of a multipage article, all pages of the article are extracted and appended together to create a, single page, full article from which media objects can be recorded.

In Content Extraction Step 605, superfluous HTML and other markup is distinguished from objects the user most likely desires. These objects are then extracted. Useful content can be separated from superfluous content by inspecting the structure of the page and the relationship between elements, and element properties themselves (such as element properties indicating that it might be a comment, an advertisement, or the body of the article). Elements of the DOM that might represent content are scored based on several possible factors including:
  i) Their text content: punctuation, number of words, number of sentences, number of paragraphs
  ii) Other content of the object, such as images or videos
  iii) Style applied to the object, particularly relating to visible and hidden content
  iv) Properties of the object, such as class name, id, tag name, and styling
  v) The score of each child of the object.

Once desirable content objects have been found based on the magnitude of their score, it is determined whether related nodes exist. Objects with the same or similar class name or styling, or that are in close proximity in the DOM (such as direct siblings, or higher-degree siblings), have their score adjusted. The final set of objects is processed to remove objects having object properties that are undesirable, such as unwanted HTML tags, objects separator information, and page separator information. The object is converted into a sanitized DOM with predetermined layout and styling suitable for consumption on the target device or devices.

In some embodiments, when a URL is provided in a recording request, Text Recorder 602 is configured to determine whether the URL points to an interstitial landing page in front of the content by using one or more of the following heuristics (though other heuristics may be used as well):
  i) Look for "Continue" links
  ii) Look for URL patterns like "welcome"
  iii) Look for counter style strings like "You will be redirected in 10 seconds"
  iv) Look for redirection away from the URL. For example, if the user requests "http://mysite.com/a/b/c" and the browser is immediately redirected to a generic pattern like "http://mysite.com/welcome?target=a/b/c" it is likely that if the recorder waits for 10 seconds, it will be redirected back to "/a/b/c" to continue its work.

In some embodiments, when a URL is provided in a recording request, Text Recorder 602 is configured to determine, in step 604, whether it is a multipage document using some of the following heuristics (though others may be used as well):
  i) Look for a link that renders a printer friendly version of the article, and verify that the link contains content similar to the original page to ensure it represents usable content.
  ii) Look for next/previous links on the page to navigate the article in a relative fashion, and dynamically determine the set of URLs to consider as part of the multipage document after each page-load of a next/previous link.
  iii) Look for absolute position information such as a numbered list of links 1, 2, 3, and use this to generate a list of URLs to visit. Each page is loaded from the list of URLs.
  iv) Look for absolute position information in the form of "first" and "last" links.
  v) Inspection of page DOM elements to see whether they contain certain classes, ids, text, or JavaScript handlers that may indicate a printable, relative, or absolute link.

Which heuristic to use to extract the content across multiple pages depends on the information contained within the page, and represents a best guess at which method will be the most reliable and complete for a given recording request and URL. If Text Recorder 602 determines the URL points to a multipage document, Text Recorder 602 then attempts to find the first page of this document so that it can build up a list of pages that comprise the entirety of the document. Going to the first involves finding a link tied to a number 1, the text "first", or by considering the URL and looking for patterns such as "page=1" or the lack of numbers altogether. Once the first page of a multipage article is identified, Text Recorder 602 is configured to then continue to generate a list of all of the pages in the article.

Determining whether or not to follow links such as page numbers in a list, or next/previous and first/last links is accomplished by, for example:
  i) Inspecting the relationship between the DOM elements on the page. In this way, Text Recorder 602 can determine whether the candidate links that may point to sequential pages in an article or the full page version of an article are unrelated to each other or are associated with each other, such as would occur in a navigation menu.
  ii) Inspection of URLs to determine page position information, whether that URL is the workload URL or that of an element on the page.
  iii) Interacting with JavaScript handlers (onclick, onhover, etc.) to determine if a link target is indeterminate, is not an http or https URL, or leads to additional content.

As Text Recorder 602 considers these potential URLs, it creates a set of URLs that comprise the entirety of pages in the multipage article. The completeness of the list of page in a multipage article is verified by ensuring it contains a consecutive set of links and by confirming that there is a "last" page. This is almost always possible by simply looking at the URL. In some cases other information such as the title of the page and content on the page such as "page x of y" are considered to confirm that the page in question should be considered in the set of pages that are part of the multipage article. In the case of long articles where only a subset of positions is visible on any given page, this list may be updated dynamically.

For multipage documents, all or part of the processing that occurs in step 605 may take place once all of the content across multiple pages has been gathered in step 604 in order to compare the characteristics across pages. This process may, for instance, allow useful content to be further isolated by more accurately determining which content is repeated on each page or is otherwise superfluous. This processing may take into account that articles may have different structure between pages, such as summary or comment pages at the end, or embedded image galleries and videos.

During text extraction step 602, a score is associated with DOM nodes and relevant candidate content is determined in step 605. This process applies also to image objects in a similar fashion to video; a score is computed from various factors including image size, aspect ratio, node id and class, position within the DOM and others. For DOM objects that contain content, child image nodes may exist. In this case, the image is likely of interest to the user and can be associated a correspondingly higher score. Images may also exist out-of-band to the extracted content, such as header or footer images or image galleries. In these cases, highly scoring images can also be extracted. In all cases, an attempt is made to determine where in the original page the image is placed relative to the text content, and this information is preserved such that later formatting of the content can result in the images rendered in the appropriate location. This ordering process applies to text content itself, embedded video elements, and any other elements on the page that may be included in the content displayed to the use.

Once a reference to an image is found in step 605, recording this image simply means downloading the image to Recording system 220 over an http or https connection from the server hosting the image. This is optionally accomplished by invoking a member of Recorders 211 configured to record images. Once a reference to any multimedia type is found in step 605, Text Recorder 602 can invoke a member of Recorders 211 configured to record that multimedia type.

Recording System 220 is configured to try to approximate what a human would do when interacting with a page. It considers a number of input signals that allow it to make decisions about what actions a user would like to take on a page, the places on a page where a user may want to take action, listen, watch, or extract content. A combination of human like behavior and automated input and monitoring is combined in to a decision making system that takes these various inputs and determines which actions to take in the virtualized environment (operating system level or browser level interactions are both possible).

DOM elements that may represent video, such as <video>, <object>, and <embed> tags, are enumerated as a page is loaded in the browser. Elements are assigned a score that reflects the likelihood of being a video interesting to the user. This score can be based on size, aspect ratio, position on the page, whether the element is visible, whether the element is located within an iframe, and the attributes of the element such as resource location, the existence and values of Flashvars, child elements of the elements are considered, and whether a <video>, <object>, or <embed> appears to be an autoplay video. Fragments of a URL that may represent video ids are extracted and compared with attributes on the candidate html element to determine if an id present in the page or iframe URL is referenced, which may indicate video is intrinsically associated with the page itself. The elements are rank ordered by score and those that score below a certain threshold are discarded. The highest scoring videos are the most likely to be interesting and we choose to interact with these candidates first. This process is typically performed by members of Recorders 211.

If the original recording request was an augmented payload, such as from Touchpoint 205B including a browser add-on, in some embodiments, Recording System 220 will be provided a set of video payloads that fully describe the DOM element they represent, and a similar scoring algorithm is applied. Each candidate video in the payload is matched to a video element on the page. Video elements that match videos in the client payload are scored much higher as they are likely the most important content on the page as both the page as it was rendered for the user on their computer and the page rendered on our remote server had this video element. Video elements that do not appear in the client payload but appear on the page may also be fetched, though it is considered less likely that those elements are interesting to the user since they were likely not visible to the user when they viewed the page.

Identified video elements (or pointers thereto) are stored in User Request Priority Queue 505 for processing by a Video Recorder 710.

Video object candidates are then popped off User Request Priority Queue 505 by Video Recorder 710 and attempts are made to play them. This may include generating a mouseclick event on the element using a Physical Action Simulator 704 or watching the screen for pixel movement using the Computer Vision Engine 703 at approximately the location on the page of the video candidate. For videos that are not visible, do not respond to a click, or that appear in the client payload but not on the page, an attempt is made to replace the page DOM with a single element generated from the video payload. In this way, the desired video can be obtained even on pages where each pageload results in a different (possibly randomized) video or set of videos, such as site homepages. The Video Recorder 710 and its component systems (702-709) are engaging with the page during these interactions and attempt to extract video from the page.

In the case where a page has a video that automatically plays, an attempt is made to determine which candidate video element in User Request Priority Queue 505 the automatically playing video corresponds to, so that Recording system 220 may consider the current member of Recorders 211 as processing that request. This element is then popped from the list of User Request Priority Queue 505 so that it is known which video is currently being processed. In some circumstances where the video playing cannot be conclusively matched with an entry in User Request Priority Queue 505, for instance when the video is being transcoded from a file created on a file system, a best guess is made at which identified object it might represent. This can be done by picking the highest scoring video from User Request Priority Queue 505, or by more sophisticated methods such as matching video metadata obtained from the file to properties obtained from the video element or matching pixels on the screen of two different video streams at exactly the same moment in the stream. Relevant metadata may include video dimensions, file size, duration, format, file location, and other properties of the video element.

Computer Vision Engine 703 is configured to see the pixels on a screen as a user would see a computer screen. The computer vision engine 703 is then able to detect changes over time in the pixels on a screen (animation, video playing, flash advertisements, and more) and is also able to use image detection algorithms to detect common collections of pixels that we have trained the system to recognize on a page, that a human would be able to quickly and easily recognize. There is not necessarily a physical screen. Rather, Computer Vision Engine 703 includes a virtualized display output that can be monitored by Video Recorder 710.

For example, in some embodiments, Computer Vision Engine is configured to detect when a video has started playing on the screen by monitoring that a certain set of pixels on a screen are changing repeatedly in a short period of time, recognize that it is in a viewable area, and asking other parts of Recording System 220 to react in the way a user would presumably act such as centering the video in the viewable area to make sure the video is fully viewable and not partially off-screen.

In some embodiments, Video Recorder 710 is trained, using machine learning algorithms, to recognize common collections of pixels ("targets") and images on a screen that a human would readily and easily also recognize. These image detection algorithms also report a confidence in the image they think they have recognized and when the image detection is highly confident, the Computer Vision Engine 703 can ask other parts of Recording system 220 to act accordingly.

Through these two techniques, our computer vision engine can detect:
  i) Play, pause, and stop buttons on a screen
  ii) A progress bar on a video player or audio player
  iii) An x button to close a window or popup
  iv) A scroll bar on a page
  v) A time signature on a video (elapsed time, how much time is remaining in a video)
  vi) Volume controls in a media player on the screen
  vii) Whether or not the changing area of a screen has changed over time
  viii) When there is no longer any visual activity on the screen.

Each of the recognized objects has zero or more associated actions when the object is positively identified. For example, if a play button is positively identified the Physical Action Simulator 704 is invoked to click on the identified object. Or if a close window (x) button is recognized, the Physical Action Simulator 704 is invoked and then the Computer Vision Engine 703 is re-invoked to rescan the page.

An Audio Signal Engine 706 operates by recognizing data that is sent by the operating system to a virtualized audio card in the virtualized environment of Video Recorder 710. By listening to the audio card, Audio Signal Engine 706 is able to determine if there is any data flowing through the audio card that would normally be outputted to a human listening to the audio from a computer.

Audio Signal Engine 706 listens to the audio card, determine by observing through the operating system, which program is the originating source of this audio data, and if it is the current virtual browser being observed, Audio Signal Engine 706 will save these signals in association with a timestamp according to the CPU of when these signals were generated. This raw audio signal is then used to determine what is happening on a screen and can be combined with a raw video signal to create a video that was "seen" and "listened to" and never saved by accessing the original source file.

Video Signal Engine 709 is configured to behave in a manner similar to Audio Signal Engine 706. However instead of looking for data flowing through a virtualized audio card, Video Signal Engine 70) looks for data flowing over a virtualized video card. This is data that would be rendered to a user if the browser's current viewable area were viewable by the user. If the video is playing away from the browser's viewable area, such as in the case of an auto-play video at the bottom of a long blog post, the video card will have data flowing over it but the pixels on the screen will not move.

This raw video data detection is particularly useful in the case where video is being played outside the currently visible area of the screen. Seeing that there is video activity somewhere off screen can let Video Recorder 710 decide if it wants to capture the raw video or try and identify where off page this video may be playing.

In some cases, this raw video signal is saved and combined with a raw audio signal to create a video that was "seen" and "listened to" and never actually saved by accessing the original source file. The timestamp of data flowing across a virtualized video card allows for this audio-video synchronization.

When videos are streamed or progressively downloaded to or through a browser by a user, there is a local cache created in the browser's file system space for the user who is watching the video. Network & File System Listener 702 is typically configured to monitor changes to a virtual file system originated by the virtual browser of Video Recorder 710 or to the actual file system of the user and determine if these changes are media related. For example, in some embodiments, if there is a flash file that is being buffered locally, the virtual or actual browser will cache a small segment of the stream on the virtual file system, and Video Recorder 710 is configured to cache these changes over a period of time and piece together the entire file. In another example, a user may have requested a URL which is itself a file that is already in a movie format and is downloaded entirely by the browser on the user's client (such as a link to a .mov file or a .flv file), Network & File system Listener 702 can detect the type of file being requested by the user, wait for it to finish downloading in the browser's cache, detect the finish event in the browser, and move the file out of the downloads folder and into a transcoding step for the user. In another example, Network & File system Listener 702 is configured to monitor media files being progressively downloaded (streamed and downloaded in their entirety while they stream at the same time) via the user's or virtual browser and copy these files into a secondary location outside the browser's cache. These progressively downloaded files typically need to be moved, renamed, and transcoded because the browser considers these temporary files and may delete or overwrite them.

When a webpage is rendered on a server, HTML, CSS, and JavaScript is created that is sent down to a user's browser. This data will then be interpreted by the user's browser to render images, text, video, advertising, and to create sophisticated interactions such as panning a map across a geography. In many cases on the modern web, the data that is sent down to the user's browser is not a final state that is to be rendered, but rather code that will be executed on the user's computer in the form of JavaScript. This code can make additional network requests (AJAX) and interact with the page in the user's client-side browser. For example, the server could send down JavaScript that manipulates the text of a web page based on who the logged in user is and rendering their first name in the page. This would happen after the user has already sent all data to the user's browser and the JavaScript is executed entirely on the user's computer.

An On Page Listener 708 is configured to detect any changes to a page by taking a snapshot of the html state in the browser when it is sent over a network connection to the user's browser or to the virtual browser of Video Recorder 710. By monitoring the virtualized browser using On Page Listener (708), Video Recorder 710 is able to take the current state of the html in the virtual browser and compare it to previous states of this html. If these states are different, client side JavaScript has modified the page or interactions Video Recorder 710 has had with the page that have triggered client side JavaScript. This HTML difference checking can be performed with respect to the entire page, not just the viewable area.

An example of the sort of detection this uncovers is a common situation where a server does not send down HTML with a link to video content. Instead, the HTML contains JavaScript, which then modifies the HTML on the user's computer to point to a video asset sitting on the server. This JavaScript modifies the page on the user's computer because it is more efficient to send a small amount of data that then requests more data than to wait, process a large amount of data, then send this large amount of data down to the user. Many common multimedia sites take this approach.

By detecting any changes to the HTML of a page using On Page Listener 708, Video Recorder 710 can identify that there is JavaScript acting on the page and as a result know that there is potentially some sort of multimedia activity happening. Typically Page Listener 708 will then invoke Physical Action System 704 to take further action in identifying and capturing the video.

Because Video Recorder 710 controls the virtual browser and virtual machine, it is able to simulate a keyboard and mouse interacting with the screen. Using Physical Action Simulator 704 it can click on the screen, scroll the browser page, close popups, click on objects, take input on where on a screen to click, click on objects identified to have a high probability of doing something that a user would do such as playing a video while minimizing the odds of doing something a user probably wouldn't do, such as clicking on a link that makes them leave the page in the middle of watching a video, enter text in to a form, and any other action that could be performed in a browser window with a mouse and/or keyboard. Physical Action Simulator is used primarily in conjunction with other systems such as the Computer Vision Engine (703) and On Page Listeners (708).

Often video publishers will want to show advertising in the video stream. In some cases this advertising is served from a different server than the video and can produce multiple downloads happening in the background by the browser until the advertisement is ready to play.

In order to protect publisher monetization and support the online video ecosystem, an Advertising Stitcher 705 takes extra care to capture these ads and intelligently determine where to insert them in to the video stream as originally intended by the publisher. In some embodiments, such as an entirely streamed video with ads dynamically inserted by the publisher into this stream, Advertising Stitcher 705 does not need to do additional work. In the case of progressively downloaded videos and files, Video Recorder may monitor the files on the file system, the order in which they are created and the duration of each video segment. For example, if a downloaded video segment is 15, 30, 45, or 60 seconds exactly then there is a high probability that the video segment is an advertisement. If it is some other duration, it is probably not an in-video advertisement. By monitoring when a file is accessed Video Recorder 710 can determine where to insert the ad into the video. The complexity is increased if the video and advertising content use different streaming mechanisms. For example, if a video is streamed but the advertisements are downloaded/cached to the file system, and then shown to the user, there are video files in two different formats coming from two different sources. Video Recorder 170 is optionally configured to take these differing file formats, understand which ones are likely advertisements intended for the video stream, possibly merge different video formats, and produce a signal stitched-together video that contains the content and the advertisements.

In addition to monitoring activity inside the virtual browser (file system changes, files downloaded, page changes, etc.) Recorders 211 are typically configured to monitor the virtual browser itself using a Browser Instance Manager 707. There are a number of situations that a user would encounter in running a non-virtual browser on their computer that Recorders 211 must handle as well. These situations include:

i) Browser crashes—Recorders 211 are configured to detect that there was data still flowing over a network connection, activity on a page, or a file being downloaded when the virtual browser crashed. Recorders 211 then restart the virtual browser by issuing the appropriate command to the virtual browser and have it return to the page it was previously recording.

ii) A virtual browser that freezes—Recorders 211 are configured to detect at an operating system level that a process is consuming an exceptional amount of memory or CPU power. This would manifest itself to a human as an extremely slow computer that appears to hang or is not being responsive. In this case, Recorders 211 can force the virtual browser to quit and restart (just as a user would Force Quit or CTRL+ATL+DELETE).

iii) Malicious pages that try to redirect the user—Recorders 211 can detect that a page or ad on the page is trying to redirect the user, and prevent the page from redirecting if it is determined that the redirect is suspicious. For example, if the redirect occurs on the same domain it is acceptable. If the redirect sends the user to another domain entirely, Recorders 211 may not allow this.

iv) Malicious pages or ads that try to trick the user— sometimes ads masquerade as content or ads masquerade as play buttons to try and trick the user into interacting with them. Recording System 220 is not immune to these types of tricks but is able to try and intelligently deal with them as a user might. For example, if a play button is clicked but that launches a popup that is not hosted on the same domain as the current site, Recorders 211 can immediately close that popup because it is likely malicious. Another example is an ad that may change the screen if a mouse moves over it. Recorders 211 can detect that the page has changed but that the change occurred with off domain content or that the content reverted to a state that was previously valid, and thus Recorders 211 should not pay attention to these changes. If a virtual browser enters a "bad" state where it has somehow left the page the user desired to record because it was tricked, Recorders 211 can hit the back button on the browser and try to record the page again but will not again take the action that resulted in the bad state.

The elements (702-709) that are included in Video Recorder 710 are optionally used together to extract content from a page. These systems can be combined together in myriad ways based on an evolving understanding of how to interact with sites and pages.

Figure 8:
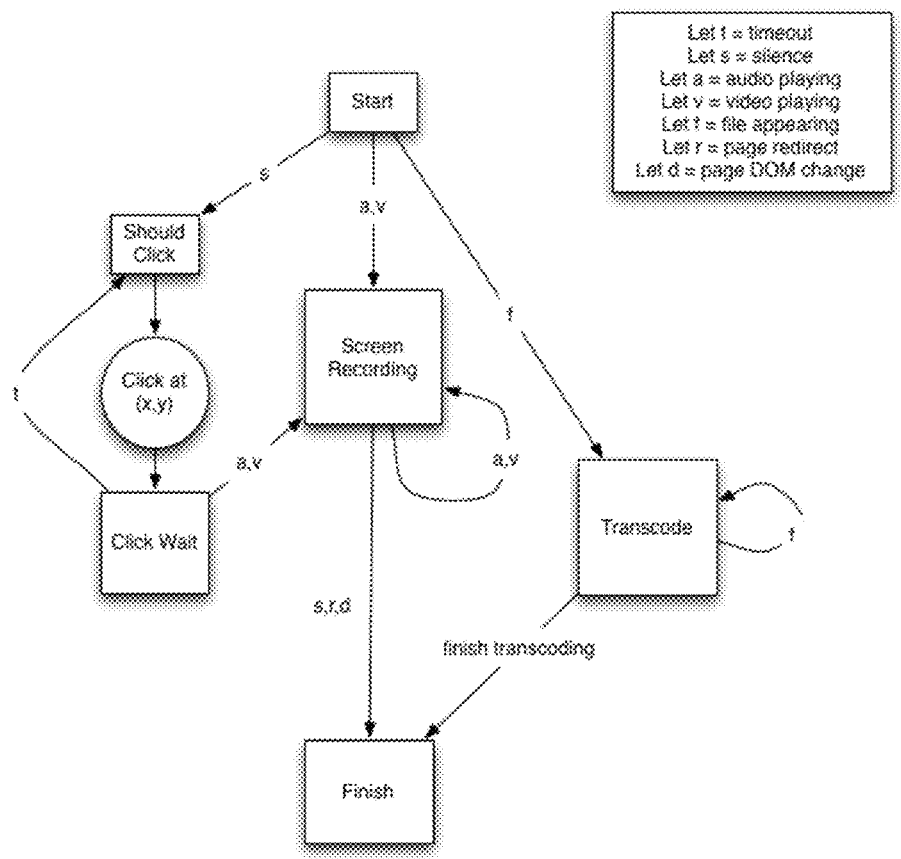
FIG. 8 is an illustration of state of a video recorder, according to various embodiments of the invention.

In one embodiment, the interaction of these elements is represented in state diagram illustrated in FIG. 8. Once a member of Recorders 211 starts, if it sees a file saved out via Network & File System Listener 702 the recorder starts to encode. If Video Recorder 710 determines that audio is playing using Audio Signal Engine 706 or that video is playing using Video Signal Engine 709, Video Recorder 710 starts to save the pixels on the screen using Computer Vision Engine 703 in a desired target format. If Video Recorder 211 does not see files or activity on the screen (of the virtual browser), then Physical Action Simulator 704 is used to click at a random location on the screen and Video Recorder 710 waits to see if video plays. Video Recorder 710 keeps doing this clicking until it is satisfied that there is no video on the page or until it times out and stops.

In one embodiment, the interaction of the elements of Video Recorder 710 is represented by the following example. First, a list of candidate video elements are passed up from a user clicking on her Touchpoint 205B including a browser add-on. Once it is determined by various parts of the Recording System 220 that a Video Recorder 710 is needed, a virtual browser 801 is started on our one of Recorders 211, e.g., Recorder 800 or 710 and the various candidate video elements on the page are considered in order of their score. The various elements (702-709) are accessible and start interacting with the page as necessary. For the first video candidate in the list, perhaps the computer vision engine 703 can watch the pixels on a screen the way a human eye would, and based on patterns of pixels it has learned to recognize (such as triangular shapes tend to be play buttons), it recognizes a triangular shape on the current video candidate. It then triggers a click using the Physical Action Simulator 704. As soon as this first candidate video starts playing as noted by the Video Signal Engine 709 and the Audio Signal Engine 706, the system is monitoring network activity or file system activity using Network & File System Listener 702 that is originating via the virtual browser and notices that the currently playing video is being progressively downloaded to the browser's cache. As this file is being progressively downloaded, a member of Transcoders 212 is taking the data in file and transcoding it to a target file (video-target-1) in a desired format. At the same time, another file gets written out to the browser's cache while the current video is playing. The Advertising Stitcher 705 is alerted that there may be an ad delivered in parallel with the currently playing video. As soon as the Advertising Stitcher 705 determines that this cached file is independent of the video playing on the screen and is exactly 30 seconds in length. The Advertising Stitcher 705 then asks the File System Listener 702 to stop feeding the data in the file currently being progressively downloaded. The Advertising Stitcher 705 switches on the Computer Vision Engine 703 to watch the screen area around the candidate video element and start saving the pixels from this area of the screen out to a video file, which is then fed by the File System Listener 702 to the same member of Transcoders 212. This guarantees that when the ad that was downloaded is accessed by the video player and shown on the screen, our Computer Vision Engine 703 will see this ad and have it saved in the video stream. The video output from the Computer Vision Engine (703) being fed to the member of Transcoders 212 will be saved out by appending it to the end of (video-target-1). After this video is complete, many sites will send the use to another video on the site automatically. The Browser Instance Manager 707 can detect that the page is being automatically redirected and will tell the Computer Vision Engine 703 to stop watching the screen and to stop sending data out to the member of Transcoders. This then produces a final output video file for this single candidate video element on a page. This output file is stored in User's Copy Memory 214 for later deliver to Internet Enabled Devices 213.

Transcoders 212 include hardware, firmware and/or software stored on a computer readable medium. Transcoders 212 are managed by a Transcoding Manager 215 and are optionally geographically distributed. Transcoding is a process of converting a file from one format to another. This can be applied to images (scaling and compressing the image to make it suitable for mobile devices), video (particular codecs will only work on certain devices), and audio (compressing the audio). The process of transcoding is well understood and the algorithms to compress or convert formats are off-the-shelf.

Transcoding is applicable in the case where files are created on Recording System 220 as a result of loading or interacting with a page. This may be initiated by a plugin downloading a video file and storing it in a temporary location, the browser caching video from an HTML5 video element, by the page being or containing a direct link to a video file, a video signal being combined with an audio signal, or the ad stitcher signaling that multiple files need to be combined in to a single stream. In the case where multiple files are associated with a single video element, for instance when the element has interstitial ads or has an autoplay feature that plays a series of videos, the files can be stitched together during the transcode process to form a single output video in order to most closely match the experience the user would have had when viewing the original page.

Transcoding can be initiated in several ways. For example, Transcoders 212 can be configured to transcode in parallel with recording of media. In this mode, a transcoder operates in parallel with a member of Recorders 211, e.g. a Video Recorder 710. For example, as a flash file is being progressively downloaded, Recording System 220 invokes a transcoder to convert the flash file into a target format to be delivered to a device. In another example, Transcoders are configured to transcode following recording of media. In this mode, a member of Transcoders 212 is only invoked after recording related activity has ceased.

Transcoding Servers (212) can be scaled. The process of allocating new transcoding servers is identical to the decision tree followed by the Recording Manager (401-410), except it uses the Current Transcoders' Status instead of Current Recorders' Status (401). The allocation of Transcoders 212 is managed by Transcoding Manager 215, which has functions and capabilities similar to those described herein in relation to Recording Queue Manager 210.

Several embodiments are specifically illustrated and/or described herein. However, it will be appreciated that modifications and variations are covered by the above teachings and within the scope of the appended claims without departing from the spirit and intended scope thereof. For example, while the examples provided herein are directed recording of user requested materials, they may alternatively be applied to automatic recording of Internet content that has not specifically been requested by a user.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein may include hardware, firmware and/or software stored on a computer readable medium. This logic may be implemented in an electronic device to produce a special purpose computing system.

What is claimed is:

1. A system comprising:
an API server configured to receive requests to record media retrieved from websites, the requests being received from remote clients of the API server;
a plurality of recorders each configured to record a received request to record media retrieved from websites that includes a specified type of media using a virtualized browser environment disposed on the respective recorder; and
a recording queue manager configured to:
determine whether a first recorder of the plurality of recorders is available to process the received request to record media retrieved from websites,
responsive to a determination that the first recorder is unavailable to process the received request to record media retrieved from websites, determine a request type of the received request, the request type of the received request associated with a type of content associated with the request, and assign requests to record media retrieved from websites to a second recorder, the second recorder configured to process requests to record media retrieved from websites having a type that matches the determined type of the received request.

2. The system of claim 1, wherein the API server is configured to receive a request to record media, the request including an augmented payload having login information.

3. The system of claim 2, wherein the augmented payload is generated by a browser add-on of one of the remote clients.

4. The system of claim 1, wherein at least one of the recorders is implemented in a virtual machine.

5. The system of claim 1, wherein at least one of the recorders is configured to record text content type and at least one of the recorders is configured to record video content type.

6. The system of claim 5, wherein the at least one recorder configured to record text is configured to assemble text disposed across multiple web pages into a single document.

7. The system of claim 5, wherein the at least one recorder configured to record video is configured to assemble a video from multiple files.

8. The system of claim 1, wherein at least one of the recorders includes a physical action simulator configured to click on objects within a web page in the virtualized browser environment.

9. The system of claim 1, wherein at least one of the recorders includes a computer vision engine configured to monitor visual changes within a web page in the virtualized browser environment.

10. The system of claim 9, wherein the computer vision engine is further configured to detect the presence of video objects within the web page.

11. The system of claim 1, wherein at least one of the recorders includes an advertising stitcher configured to add an advertisement to a video such that the video is recorded with the advertisement.

12. The system of claim 1, wherein at least one of the recorders includes a browser instance manager configured to manage the operation of a browser in the virtualized browser environment.

13. The system of claim 1, wherein at least one of the recorders includes a network and file system listener configured to monitor file access in the virtualized browser environment.

14. The system of claim 1, wherein at least one of the recorders is an administrator owned recorder and at least one of the recorders is a volunteer recorder owned by a sender of requests to record media.

15. The system of claim 1, wherein the plurality of recorders are geographically distributed.

16. The system of claim 1, wherein at least one of the recorders is configured to parse a web page and identify recordable objects.

17. The system of claim 1, wherein at least one of the recorders is configured to parse a web page and distinguish between
   a) content of the web page that is less desirable to record and
   b) content of the web page that is more desirable to record.

18. The system of claim 1, wherein at least one of the recorders is configured to generate additional recording requests based on identification of multiple recordable objects within a web page.

19. The system of claim 1, wherein the recording queue manager is configured to prioritize recording requests based on information about senders of the recording requests.

20. The system of claim 1, wherein the recording queue manager is configured to assign recording requests to members of the plurality of recorders based on a type of content included in the request.

21. The system of claim 1, wherein the recording queue manager is configured to allocate additional recorders based on recording request demand.

22. The system of claim 1, further comprising a plurality of transcoders configured to convert recorded media into formats for communication to and display on internet enabled devices.

23. A method of recording media, the method comprising:
   receiving at a server a request to record media from a webpage, the request including an address of the webpage;
   placing the received request to record media from the webpage in a queue of recording requests;
   assigning the received request to record media from the webpage to a recorder geographically remote from the server;
   using the recorder to load the webpage into a virtualized browser environment;
   parsing the loaded webpage to identify recordable objects within the webpage;
   generating a first recording request for a first of the recordable objects, the first of the recordable objects including a text article disposed across multiple webpages;
   generating a second recording request for a second of the recordable objects, the second of the recordable objects including a video;
   assigning the first recording request to a text recorder;
   assigning the second recording request to a video recorder;
   saving an output of the text recorder generated in response to the first recording request; and saving an output of the video recorder generated in response to the second recording request.

* * * * *